United States Patent [19]

Nishimura et al.

[11] Patent Number: 4,832,165

[45] Date of Patent: May 23, 1989

[54] CLUTCH BRAKE

[75] Inventors: Yoshio Nishimura, Neyagawa; Masaaki Asada, Ibaragi, both of Japan

[73] Assignee: Kabushiki Kaisha Daikin Seisakusho, Osaka, Japan

[21] Appl. No.: 180,867

[22] PCT Filed: Aug. 5, 1987

[86] PCT No.: PCT/JP87/00588

§ 371 Date: Feb. 26, 1988

§ 102(e) Date: Feb. 26, 1988

[30] Foreign Application Priority Data

Aug. 25, 1986 [JP] Japan ................... 61-198515

[51] Int. Cl.$^4$ .......................................... F16D 67/02
[52] U.S. Cl. ............................. 192/13 R; 192/18 R; 192/103 R; 192/105 BA
[58] Field of Search ............. 192/13 R, 18 R, 103 R, 192/105 BA

[56] References Cited

U.S. PATENT DOCUMENTS

| 4,043,437 | 8/1977 | Taylor | 192/13 R |
| 4,369,616 | 1/1983 | Cody et al. | 192/18 R |

FOREIGN PATENT DOCUMENTS

| 42-6837 | 3/1967 | Japan . | |
| 49-75977 | 7/1974 | Japan . | |
| 50-278 | 1/1975 | Japan . | |
| 2109499 | 6/1983 | United Kingdom | 192/13 R |

Primary Examiner—Leslie A. Braun
Assistant Examiner—Andrea Pitts
Attorney, Agent, or Firm—Armstrong, Nikaido, Marmelstein, Kubovcik & Murray

[57] ABSTRACT

A clutch brake having a hub flange with a brake assembly installed between two cover elements forming a cover assembly, external friction surfaces on the cover elements, recessions formed on an outer peripheral part of the hub flange, centrifugal segments urged by a centrifugal force toward radial outsides of the hub flange installed in the recessions and spring members in the recessions urging the centrifugal segments radially outwardly of the recessions for generating an initial torque between the centrifugal segments and the hub flange.

16 Claims, 3 Drawing Sheets

CLUTCH BRAKE

TECHNICAL FIELD

This invention relates to a clutch brake, utilized particularly for an asynchronous heavy duty transmission, and especially to a clutch brake having a brake assembly connectable to a rotatable shaft and a cover assembly providing an external friction surface, supported rotatably relatively to the brake assembly.

BACKGROUND ART

With regard to this kind of clutch brake, the applicant of the present invention has heretofor developed a clutch brake, as illustrated in FIG. 6, and has applied for a patent (Japanese application No.: 61-46786, Date of application: Mar. 4, 1986 corresponding U.S. patent application Ser. No. 021,066, filed Mar. 3, 1987, now U.S. Pat. No. 4,782,926, dated Nov. 8, 1988).

In such prior clutch brake, a coned disc spring 100 is interposed between a cover assembly C and a brake assembly B so as to improve the torque characteristic produced by the brake assembly B. However, even though an inertial torque working on an output shaft (connecting to a transmission equipped with no synchro mechanism) increases with an increase in a rotation speed, a brake torque can not be increased with an increase in the rotation speed.

Further, the engagement action at time of increased rotation speed is done abruptly, so that facings 110 will be worn out quickly.

DISCLOSURE OF INVENTION

An object of the invention is to provide a clutch brake which can increase braking torque with an increase in a rotation speed and reduce wear of the friction facings.

This invention relates to a clutch brake having a brake assembly connectable to a rotatable shaft with accompanied driving action and a cover assembly providing external friction surfaces and supported rotatably relatively to the brake assembly; characterized by that a hub flange composing said brake assembly and connected to an output shaft is installed between two approximately disc-like cover elements facing each other and composing the cover assembly, recessed opening toward the radial outsides of the hub flange are formed on an outer peripheral part of the hub flange, centrifugal segments are urged by centrifugal force toward the radial outsides of the hub flange and are installed in the recessed openings and spring members for generating an initial torque, and which press the centrifugal segments against a sliding contact surface of the cover assembly facing an outer peripheral surfaces of the centrifugal segments, are interposed between the centrifugal segments and the hub flange.

The spring force of the spring member presses the centrifugal segment against the sliding contact surface of the cover assembly to generate the initial torque.

When the rotation speed increases, the outer peripheral surface of the centrifugal segment contat, slidingly, with the sliding contact surface by means of the centrifugal force acting on the centrifugal segment and generate friction torque. This friction torque is added to the initial torque to multiply the torque characteristic.

BEST MODE FOR CARRYING OUT THE INVENTION

Figure 1:
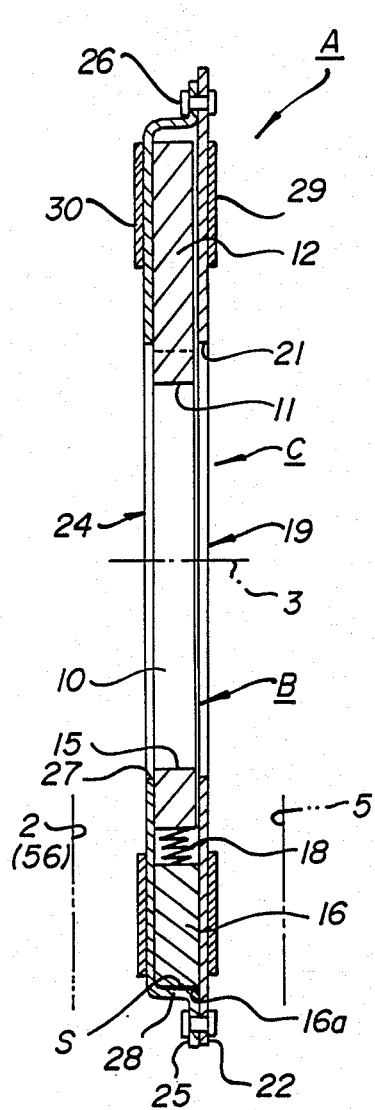
FIG. 1 is a sectional view taken on a line I—I of FIG. 2 showing an embodiment of the invention.

In FIG. 1 showing the clutch brake according to the present invention, 10 is an approximately annular hub which fits onto an output shaft 3 (only its center line being shown) and rotates together with the output shaft 3. A through hole 15, for output shaft 3 is formed on an inner peripheral part of the hub 10. Two projections 11, for example, facing each other, are formed at predetermined places on the through hole 15, and mesh with the output shaft 3 so that the hub 10 rotaes integrally with output shaft 3.

Figure 2:
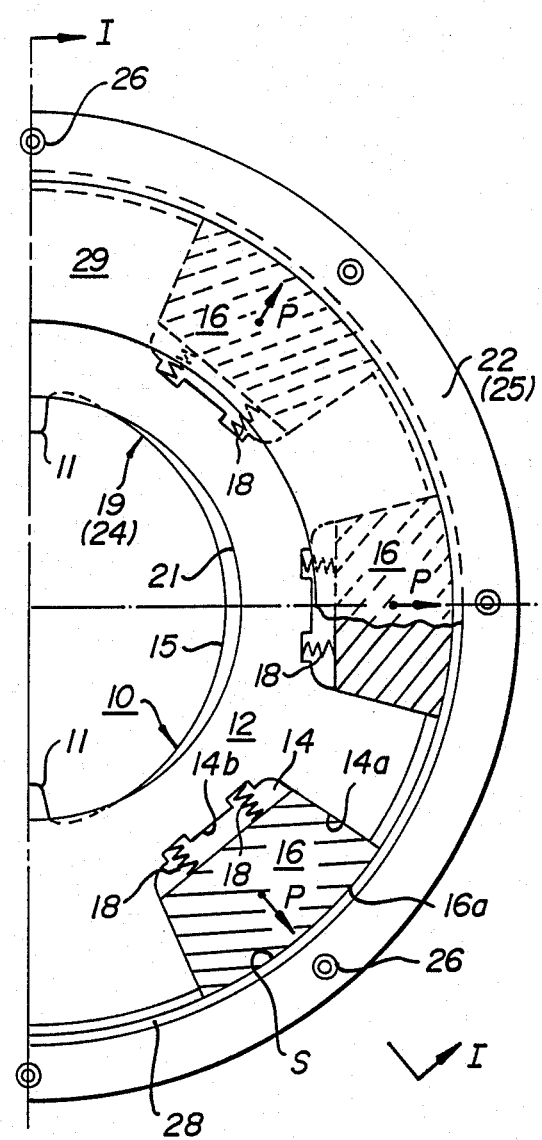
FIG. 2 is a partially cut-away front view.
Figure 2A:
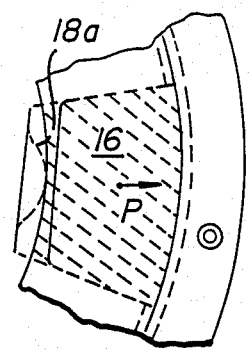
FIGS. 2a and 2b are views of a portion of the apparatus of FIG. 2 but showing modified spring arrangements.
Figure 2B:
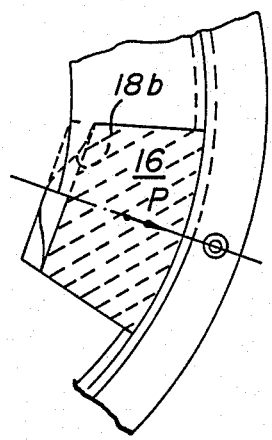
Figure 2C:
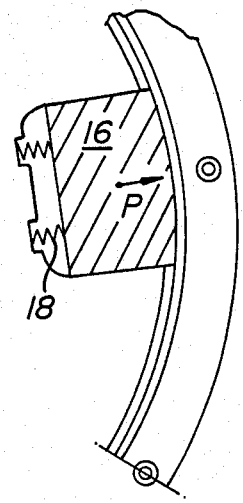
FIG. 2c is a view of a portion of the apparatus of FIG. 2 but showing a modified recession arrangement.

A radially outwardly extending hub flange 12 is formed on the hub 10. Notches 14, on recessions are formed on the outer periphery of hub flange 12 at six circumferential places (only three places being shown), for example, as illustrated in FIG. 2. A weight, or centrifugal segment, 16 (centrifugal segment) which is an essential part of the invention is positioned in each of the notch 14 for free sliding in the radial direction. Side edges 14a of the notch 14 open radially outwardly but parallel side edges 14'a, as shown in FIG. 2c may be employed.

Outer peripheral surface 16a of weight 16 is formed into a circular shape. The outer peripheral surface 16a is pressed, in the direction of arrow P, by centrifugal force generated at the time of rotation, so as to be in sliding contact with inner surface S of cover assembly C described later.

Compression coil springs 18 are interposed between the inner peripheral surface of the weight 16 and the bottom surface 14b of the notch 14. In an initial state, where the clutch brake does not rotate, the compression coil spring 18 presses weight 16 into contact with surface S so as to exert an initial torque (braking torque) on the output shaft 3 (FIG. 1) during initial rotation of shaft 3. A leaf spring 18a FIG. 2b or an inverted leaf spring 18b, FIG. 2c may be used in place of the compression coil spring 18.

The brake assembly B is comosed of the above-mentioned hub 10, the notch 14, the weight 16 and the compression coil spring 18 etc.

Retaining cover or cover element 19 at the right side of FIG. 1, has a through hole 21 through which shaft 3 passes and is formed at the axis center of the side. A flange 22, providing a connection with a cover 24, is formed on its outer peripheral part.

Driven cover or cover element 24 at the left side of FIG. 1, a through hole 27, for passing the output shaft 3 passes and is formed at the axis center of the side. A bent portion 28, bent into an approximately L-shape, is formed on the outer peripheral part. An inner peripheral surface of the bent portion 28 provides the sliding contact surface S with which the outer peripheral surface 16a contacts, and a flange 25 providing the connection with the retaining cover 19 is formed on driven cover 24.

Flanges 25 and 22 are fastened together by eight rivets 26 equally spaced in a circumferential direction. The flanges 25 and 22 may be fastened together by means of crimping by folding either of the flanges 22 on the other is generally known.

Annular friction facings 29 and 30 are bonded to outside surfaces of the retaining cover 19 and the driven cover 24, respectively, so that friction torque can be transmitted by contacting the friction facings with a cap 5 and a release bearing 2 as will be described later.

Figure 5:
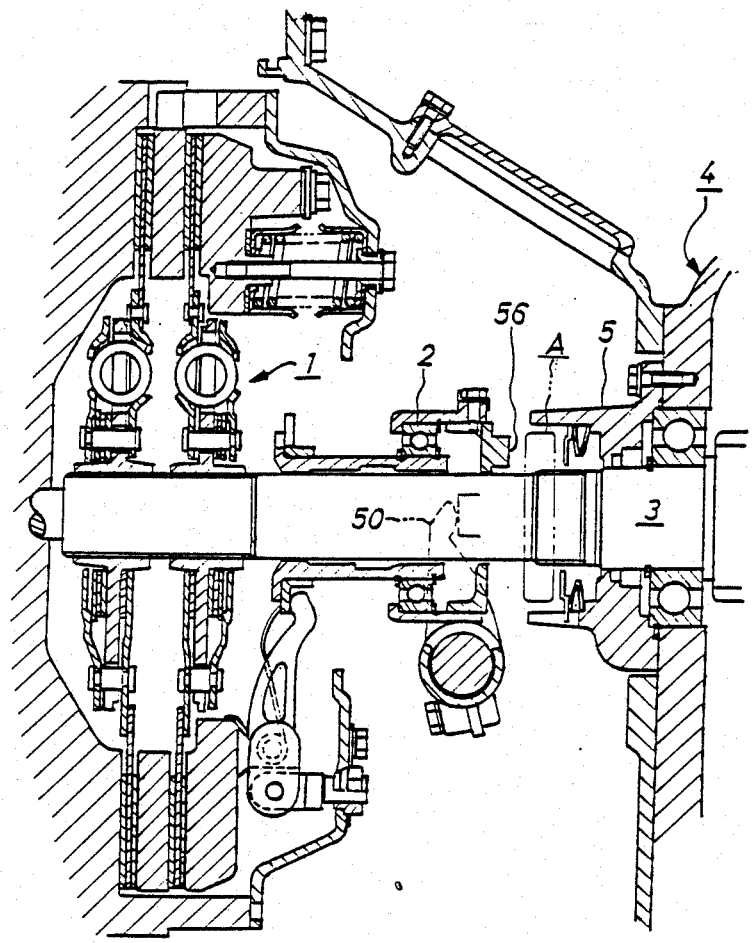
FIG. 5 is a vertical sectional schematic view showing a so-called pull type clutch for use in the clutch brake according to the present invention.

As illustrated in FIG. 5, the foregoing clutch brake A is installed between the cap 5 and pressing face 56 of release bearing 2 moved by a release lever 50 in the axial direction of output shaft 3. A clutch 1, of the so-called pull type, is released or disengaged when release bearing 2 is pulled by release lever 50, toward the transmission 4.

In FIG. 5 cap 5 is secured to transmission 4 so that the clutch brake A can exert an inertial braking torque on the output shaft 3 of the transmission 4 having a so-called synchro mechanism at the time of speed changes. Because the output shaft 3 is apt to continue rotation when clutch 1 is disengaged, the clutch brake A exerts braking torque on the output shaft 3.

Function will be described hereunder. When the clutch 1 (FIG. 5) is in the engaged state, clutch brake A rotates freely and integrally with input shaft 3. When the release bearing 2 moves toward the right side of FIG. 5 to disengage the clutch 1 (FIG. 5), the clutch brake A is pressed by the release bearing 2 toward transmission 4. The release bearing 2 is brought into contact with cap 5 which is a stationary, non rotating member. Friction torque is generated between cap 5 and release bearing 2, and friction facings 29 and 30. Such friction torque is transmitted from sliding contact surface S of the driven cover 24 to the outer peripheral surface 16a, so that the braking torque acts on the brake assemmbly B side. Further, braking torque is transmitted from the brake assembly B to the output shaft 3. Thus, the output shaft 3, which would otherwise continue its rotation due to the inertia is braked by the clutch brake assembly, so that a gear shifting operation can be completed.

Figure 3:
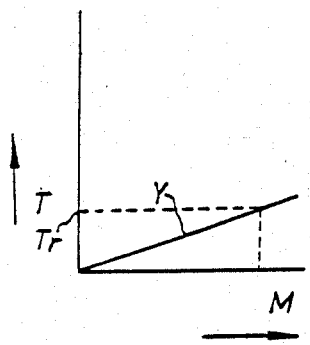
FIG. 3 is a graph showing the relation between the friction member wear amount and torque characteristic.
Figure 6:
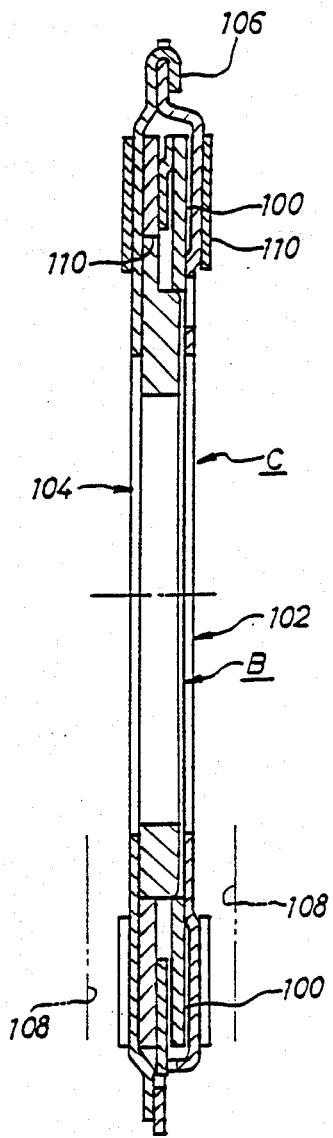
FIG. 6 is a partially cut-away schematic side view showing the clutch brake of our earlier application.

In the transmission mode of the cover assembly C, wherein the clutch brake A does not rotate, i.e. the initial state, a magnitude of the friction torque transmitted from the sliding contact surface S to the weight 16 is restricted only by the spring force of the compression coil spring 18. As shown in FIG. 3, which shows the change of torque T in relation to a wear allowance M, a characteristic line of relation between the friction member wear allowance and the torque can be obtained from the characteristic of the compression coil spring 18. Namely, a maximum transmission torque value Tr is obtained from a characteristic Y, and this maximum transmission torque value Tr is restricted by the friction torque between the outer peripheral surface 16a and the sliding contact surface S (FIG. 2) generated by the spring force of the compression coil spring 18.

Figure 4:
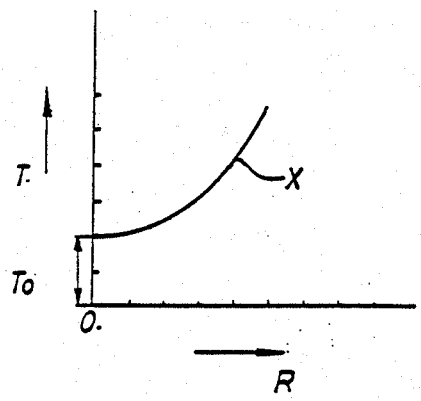
FIG. 4 is a graph showing the relation between the rotation speed and the torque characteristic.

Moreover, in a transmission mode of the cover assembly C wherein the clutch brake A rotates, a magnitude of the friction torque, transmitted from the sliding contact surface S to the weight 16 is controlled variably by a resultant force of the spring force of the compression coil spring 18 and the centrifugal force of the weight 16 acting in the direction of arrow P of FIG. 2. Namely, as shown in FIG. 4, a change of torque T in relation to rotation speed R, an initial torque To is generated by the friction torque T between the outer peripheral surface 16 and the sliding contact surface S owing to the spring force of the compression spring 18 even when the rotation speed R is zero. The characteristic curve X is developed when the torque T increases with an increase in the rotation speed R. The recession means may be in the shape of the notch 14, as shown in FIG. 2, or may be any other shape but also any shape, which can incorporate the weight 16 freely slidingly in the radial direction of the hub flange 12.

As described above, in the clutch brake according to the present invention; the hub flange 12 composing the brake assembly B and connected to the output shaft is installed between the two approximately disc-like covers or cover element 19 and 24 facing each other and composing of the cover assembly C, the notches or recessions 14 opening toward radial outsides of the hub flange 12, formed on the outer peripheral part of the hub flange 12, the weights 16 or centrifugal segments urged by the centrifugal force toward the radial outsides of the hub flange 12, installed in the notches 14, and the compression coil springs 18 or spring member for generating the initial torque, and which press the weights 16 against the sliding contact surface S of the cover assembly C facing on the other peripheral surfaces of the weights 16, interposed between the weights 16 and the hub flange 12. Therefore, the magnitude of the friction torque occurs from the sliding contact surface S to the weight 16 can be controlled variably by the resultant force of the spring force of the compresion coil spring 18 and the centrifugal force of the weight 16 acting in the direction of arrow P of FIG. 2.

Accordingly, as seen from the characteristic X of FIG. 4, the initial torque To can be generated by the friction torque between the outer peripheral surface 16 and the sliding contact surface S owing to the spring force of the compression coil spring 18 even when the rotation speed R is zero. The torque T can be increased like a secondary function with the increase in the rotation speed R, and a large braking torque can be generated correspondingly to the initial torque of the output shaft 3 which increases with the increase in the rotation speed R.

Consequently, the output shaft 3 can be stopped quickly so that wear amounts of the friction facings 29 and 30 can be minimized and at the same time the gear shifting operation can be eased even in case of the transmission 4 with no synchro mechanism.

We claim:

1. A clutch brake having a brake assembly connectable to a rotary output shaft and a cover assembly having external friction surfaces and supported rotatably relative to said brake assembly; characterized by that a hub flange is connected to said output shafft and installed between two approximately disc-like cover elements facing each other and composing said cover assembly, recessions opening facing radial outward of said hub flange on an outer peripheral part of said hub flange, centrifugal segments urged by centrifugal force toward the radial outsides of said hub in said recessions, and spring members for generating an initial torque and which press said centrifugal segments against a sliding contact surface of said cover assembly facing outer peripheral surfaces of said centrifugal segments interposed between said centrifugal segments and said hub flange.

2. A clutch brake as set forth in claim 1, in which side edges of said recessions extend comprise side edges in the radial direction of said hub flange.

3. A clutch brake as set forth in claim 1, in which side edges of said recessions extend parallel with each other.

4. A clutch brake as set forth in any one of claim 1 through 3, in which said spring member comprises a coil spring.

5. A clutch brake as set forth in claim 4, in which said cover elements comprise a retaining cover and a driven cover, and an outer peripheral flange of said retaining cover and an outer peripheral flange of said driven cover are fastened together by rivets.

6. A brake clutch as set forth in claim 4, in which said centrifugal segment comprises a weight.

7. A clutch brake as set forth in claim 4, in which said cover elements comprise a retaining cover and a driven cover, and an outer peripheral flange of said retaining cover and an outer peripheral flange of said driven cover are crimped together.

8. A clutch brake as set forth in any one of claim 1 through 3, in which said spring member comprises a leaf spring.

9. A clutch brake as set forth in claim 8, in which said cover elements comprise a retaining cover and a driven cover, and an outer peripheral flange of said retaining cover and an outer peripheral flange of said driven cover are fastened together by rivets.

10. A brake clutch as set forth in claim 8, in which said centrifugal segment comprises a weight.

11. A clutch brake as set forth in claim 8, in which said cover elements comprise a retaining cover and a driven cover, and an outer peripheral flange of said retaining cover and an outer peripheral flange of said driven cover are crimped together.

12. A clutch brake as set forth in any one of claim 1 through claim 3, in which said cover elements comprise a retaining cover and a driven cover, and an outer peripheral flange of said retaining cover and an outer peripheral flange of said driven cover are fastened together by rivets.

13. A brake clutch as set forth in claim 12, in which said centrifugal segment comprises a weight.

14. A brake clutch as set forth in any one of claim 1 through claim 3, in which said centrifugal segment comprises a weight.

15. A clutch brake as set forth in any one of claim 1 through claim 3 in which said cover elements comprise a retaining cover and a driven cover and an outer peripheral flange of said driven cover are crimped together.

16. A brake clutch as set forth in claim 15, in which said centrifugal segment comprises a weight.

* * * * *